(12) United States Patent
Yu et al.

(10) Patent No.: US 8,594,139 B2
(45) Date of Patent: Nov. 26, 2013

(54) DUAL TRANSMISSION STREAM GENERATING DEVICE AND METHOD

(75) Inventors: Jung-pil Yu, Suwon-si (KR); Hae-joo Jeong, Seoul (KR); Eui-jun Park, Seoul (KR); Joon-soo Kim, Seoul (KR); Yong-sik Kwon, Seoul (KR); Jin-Hee Jeong, Anyang-si (KR); Yong-deok Chang, Suwon-si (KR); Kum-rar Ji, Seoul (KR); Jong-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1566 days.

(21) Appl. No.: 11/503,970

(22) Filed: Aug. 15, 2006

(65) Prior Publication Data

US 2007/0091916 A1    Apr. 26, 2007

Related U.S. Application Data

(60) Provisional application No. 60/728,777, filed on Oct. 21, 2005, provisional application No. 60/734,295, filed on Nov. 8, 2005, provisional application No. 60/738,050, filed on Nov. 21, 2005, provisional application No. 60/739,448, filed on Nov. 25, 2005, provisional application No. 60/788,707, filed on Apr. 4, 2006.

(30) Foreign Application Priority Data

Jul. 20, 2006    (KR) .................................. 2006-68057

(51) Int. Cl.
*H04J 3/00* (2006.01)
*H04N 7/12* (2006.01)
*H04J 3/16* (2006.01)
*H04N 7/50* (2006.01)

(52) U.S. Cl.
CPC ................ *H04J 3/1682* (2013.01); *H04N 7/50* (2013.01)
USPC ...................................... 370/528; 375/240.01

(58) Field of Classification Search
USPC ........... 370/527, 528; 375/240.01; 725/63, 73
See application file for complete search history.

(56) References Cited

U.S. PATENT DOCUMENTS 6,498,865 B1    12/2002    Brailean et al.
7,408,982 B2    8/2008    Jeon et al.
(Continued)

FOREIGN PATENT DOCUMENTS

CA    2677963 A1    11/2005
CA    2677967 A1    11/2005
(Continued)

OTHER PUBLICATIONS

International Search Report mailed on Feb. 5, 2007, in International Application No. PCT/KR2006/004302.
(Continued)

*Primary Examiner* — Paul H Masur
(74) *Attorney, Agent, or Firm* — Sughrue Mion, PLLC (57) ABSTRACT

A dual transmission stream generating device includes an adaptor to receive a normal stream and to generate an adaptation field in an area of a packet of the normal stream; and a stuffer to generate a packet for a dual transmission stream by stuffing a turbo stream into the adaptation field. Accordingly, the turbo stream and the normal stream can be transmitted efficiently by the generation of the dual transmission stream in various constructions.

46 Claims, 6 Drawing Sheets

(56) References Cited

U.S. PATENT DOCUMENTS

| | | | |
|---|---|---|---|
| 8,050,298 B2 | 11/2011 | Yu et al. | |
| 2002/0126222 A1 | 9/2002 | Choi et al. | |
| 2002/0194570 A1* | 12/2002 | Birru et al. | 714/792 |
| 2003/0099303 A1* | 5/2003 | Birru et al. | 375/265 |
| 2004/0016003 A1 | 1/2004 | Lee | |
| 2004/0032529 A1 | 2/2004 | Jeon et al. | |
| 2005/0089095 A1* | 4/2005 | Choi et al. | 375/240.12 |
| 2005/0097428 A1* | 5/2005 | Chang et al. | 714/776 |
| 2005/0152410 A1* | 7/2005 | Bretl et al. | 370/535 |
| 2005/0152411 A1* | 7/2005 | Breti et al. | 370/535 |
| 2005/0271158 A1* | 12/2005 | Birru | 375/270 |
| 2006/0050780 A1* | 3/2006 | Cooper et al. | 375/240.01 |
| 2006/0050781 A1* | 3/2006 | Cooper et al. | 375/240.01 |
| 2006/0056505 A1* | 3/2006 | Ramaswamy et al. | 375/240.01 |
| 2006/0082474 A1* | 4/2006 | Cooper et al. | 341/50 |
| 2006/0088119 A1* | 4/2006 | Fu et al. | 375/265 |
| 2006/0117360 A1* | 6/2006 | Cooper et al. | 725/100 |
| 2006/0126717 A1* | 6/2006 | Boyce et al. | 375/240.01 |
| 2006/0126733 A1* | 6/2006 | Boyce et al. | 375/240.12 |
| 2006/0200853 A1* | 9/2006 | Simon | 725/118 |
| 2006/0269012 A1* | 11/2006 | Kim et al. | 375/270 |
| 2007/0091916 A1 | 4/2007 | Yu et al. | |
| 2007/0248183 A1* | 10/2007 | Park et al. | 375/295 |
| 2007/0268979 A1* | 11/2007 | Chang et al. | 375/265 |
| 2009/0103599 A1 | 4/2009 | Yu et al. | |

FOREIGN PATENT DOCUMENTS

| | | |
|---|---|---|
| JP | 9-121333 A | 5/1997 |
| JP | 10-322228 A | 12/1998 |
| JP | 2000-244923 A | 9/2000 |
| JP | 2001-333280 A | 11/2001 |
| JP | 2004-80789 A | 3/2004 |
| KR | 10-2005-0107287 A | 11/2005 |
| KR | 10-2005-0109052 A | 11/2005 |
| KR | 10-0740202 A | 7/2007 |
| WO | WO 99/05854 | 2/1999 |
| WO | WO 2004/004316 A1 | 1/2004 |
| WO | 2004/043073 A1 | 5/2004 |
| WO | 2004062283 A1 | 7/2004 |
| WO | 2004068775 A2 | 8/2004 |
| WO | 2005/002229 A2 | 1/2005 |

OTHER PUBLICATIONS

Written Opinion of the International Searching Authority mailed on Feb. 5, 2007, in International Application No. PCT/KR2006/004302.
U.S. Appl. No. 11/416,254, filed May 3, 2006, Jung-pil Yu et al., Samsung Electronics Co., Ltd.
U.S. Appl. No. 11/416,258, filed May 3, 2006, Yong-sik Kwon et al., Samsung Electronics Co., Ltd.
U.S. Appl. No. 11/416,457, filed May 3, 2006, Jung-pil Yu et al., Samsung Electronics Co., Ltd.
U.S. Appl. No. 11/504,024, filed Aug. 15, 2006, Jung-pil Yu et al., Samsung Electronics Co., Ltd.
U.S. Appl. No. 11/504,027, filed Aug. 15, 2006, Jung-pil Yu et al., Samsung Electronics Co., Ltd.
U.S. Appl. No. 11/504,029, filed Aug. 15, 2006, Jung-pil Yu et al., Samsung Electronics Co., Ltd.
U.S. Appl. No. 11/504,030, filed Aug. 15, 2006, Jung-pil Yu et al., Samsung Electronics Co., Ltd.
U.S. Appl. No. 11/504,031, filed Aug. 15, 2006, Jung-pil Yu et al., Samsung Electronics Co., Ltd.
U.S. Appl. No. 11/504,038, filed Aug. 15, 2006, Jung-pil Yu et al., Samsung Electronics Co., Ltd.
U.S. Appl. No. 11/504,651, filed Aug. 16, 2006, Jung-pil Yu et al., Samsung Electronics Co., Ltd.
U.S. Appl. No. 11/504,724, filed Aug. 16, 2006, Jung-pil Yu et al., Samsung Electronics Co., Ltd.
U.S. Appl. No. 11/504,725, filed Aug. 16, 2006, Jung-pil Yu et al., Samsung Electronics Co., Ltd.
U.S. Appl. No. 11/504,726, filed Aug. 16, 2006, Jung-pil Yu et al., Samsung Electronics Co., Ltd.
U.S. Appl. No. 11/505,369, filed Aug. 17, 2006, Jung-pil Yu et al., Samsung Electronics Co., Ltd.
U.S. Appl. No. 11/505,894, filed Aug. 18, 2006, Eui-jun Park et al., Samsung Electronics Co., Ltd.
U.S. Appl. No. 11/508,144, filed Aug. 23, 2006, Jung-pil Yu et al., Samsung Electronics Co., Ltd.
U.S. Appl. No. 11/523,716, filed Sep. 20, 2006, Jung-pil Yu et al., Samsung Electronics Co., Ltd.
U.S. Appl. No. 11/692,509, filed Mar. 28, 2007, Hae-joo Jeong et al., Samsung Electronics Co., Ltd.
U.S. Appl. No. 12/261,780, filed Oct. 30, 2008, Jung-pil Yu et al., Samsung Electronics Co., Ltd.
Canadian Office Action issued Aug. 3, 2011 in counterpart Canadian Application No. 2625353.
Communication, dated Sep. 29, 2011, issued by the Mexican Patent Office in corresponding Mexican Application No. MX/a/2008/005203.
Communication dated Jan. 10, 2012, issued by the Japanese Patent Office in counterpart Japanese Application No. 2009-233605.
Communication dated Jan. 10, 2012, issued by the Japanese Patent Office in counterpart Japanese Application No. 2008-536512.
Communication dated Mar. 20, 2012, issued by the Korean Intellectual Property Office in counterpart Korean Application No. 10-2008-0036860.
Office Action issued Mar. 1, 2012 by the Mexican Patent Office in counterpart Mexican Application No. MX/a/2008/005203.
Office Action issued May 29, 2012 by the Japanese Patent Office in counterpart Japanese Application No. 2008-536512.
Office Action issued May 29, 2012 by the Japanese Patent Office in counterpart Japanese Application No. 2009-233605.
Communication issued May 31, 2012 by the Mexican Intellectual Property Office in counterpart Mexican Application No. MX/a/2009/010261.

* cited by examiner

| SYNC | HEADER | AF HEADER | TURBO DATA | Normal Data |
|---|---|---|---|---|
| SYNC | HEADER | AF HEADER | TURBO DATA | Normal Data |
| SYNC | HEADER | AF HEADER | TURBO DATA | Normal Data |
| SYNC | HEADER | AF HEADER | TURBO DATA | Normal Data |

FIG. 7

| SYNC | HEADER | AF HEADER | TURBO DATA | Normal Data | 710 |
|---|---|---|---|---|---|
| SYNC | HEADER | | Normal Data | | |
| SYNC | HEADER | | Normal Data | | 720 |
| SYNC | HEADER | | Normal Data | | |
| SYNC | HEADER | AF HEADER | TURBO DATA | Normal Data | 710 |
| SYNC | HEADER | | Normal Data | | |
| SYNC | HEADER | | Normal Data | | 720 |
| SYNC | HEADER | | Normal Data | | |

FIG. 8

| SYNC | HEADER | TURBO Data | | | 810 |
|---|---|---|---|---|---|
| SYNC | HEADER | Normal Data | | | |
| SYNC | HEADER | Normal Data | | | 820 |
| SYNC | HEADER | Normal Data | | | |
| SYNC | HEADER | TURBO Data | | | 810 |
| SYNC | HEADER | Normal Data | | | |
| SYNC | HEADER | Normal Data | | | 820 |
| SYNC | HEADER | Normal Data | | | |

FIG. 9

| SYNC | HEADER | TURBO Data | | | 905 |
|---|---|---|---|---|---|
| SYNC | HEADER | AF HEADER | TURBO Data | Normal Data | 910 |
| SYNC | HEADER | Normal Data | | | |
| SYNC | HEADER | Normal Data | | | 920 |
| SYNC | HEADER | TURBO Data | | | |
| SYNC | HEADER | AF HEADER | TURBO Data | Normal Data | |
| SYNC | HEADER | Normal Data | | | |
| SYNC | HEADER | Normal Data | | | |

FIG. 10

| | 3 bytes | 2 bytes | 128 bytes | 182-128 bytes | |
|---|---|---|---|---|---|
| 1 | HEADER | AF Header | Turbo data | Normal data | ~1010 |
| 2 | HEADER | | Normal data | | |
| 3 | HEADER | | Normal data | | ~1020 |
| 4 | HEADER | | Normal data | | |
| 5 | HEADER | AF Header | Turbo data | Normal data | ~1010 |
| 6 | HEADER | | Normal data | | |
| 7 | HEADER | | Normal data | | ~1020 |
| 8 | HEADER | | Normal data | | |
| 9 | HEADER | AF Header | Turbo data | Normal data | |
| 10 | HEADER | | Normal data | | |
| 11 | HEADER | | Normal data | | |
| 12 | HEADER | | Normal data | | |
| 13 | HEADER | AF Header | Turbo data | Normal data | |
| 14 | HEADER | | Normal data | | |
| 15 | HEADER | AF Header | reserved for PCR(6 bytes) | 171 bytes of Normal data | ~1030 |
| 16 | HEADER | | Normal data | | |
| 17 | HEADER | AF Header | Turbo data | Normal data | |
| 18 | HEADER | | Normal data | | |
| 19 | HEADER | | Normal data | | |
| 20 | HEADER | | Normal data | | |
| 21 | HEADER | AF Header | Turbo data | Normal data | |
| 22 | HEADER | | Normal data | | |
| 23 | HEADER | | Normal data | | |
| 24 | HEADER | | Normal data | | |
| 25 | HEADER | AF Header | Turbo data | Normal data | |
| 26 | HEADER | | Normal data | | |
| 27 | HEADER | | Normal data | | |
| 28 | HEADER | | Normal data | | |
| 29 | HEADER | AF Header | Turbo data | Normal data | |
| 30 | HEADER | | Normal data | | |
| 31 | HEADER | | Normal data | | |
| 32 | HEADER | | Normal data | | |
| 33 | HEADER | AF Header | Turbo data | Normal data | |
| 34 | HEADER | | Normal data | | |
| 35 | HEADER | | Normal data | | |
| 36 | HEADER | | Normal data | | |
| 37 | HEADER | AF Header | Turbo data | Normal data | |
| 38 | HEADER | | Normal data | | |
| 39 | HEADER | | Normal data | | |
| 40 | HEADER | | Normal data | | |
| 41 | HEADER | AF Header | Turbo data | Normal data | |
| 42 | HEADER | | Normal data | | |
| 43 | HEADER | | Normal data | | |
| 44 | HEADER | | Normal data | | |
| 45 | HEADER | AF Header | Turbo data | Normal data | |
| 46 | HEADER | | Normal data | | |
| 47 | HEADER | | Normal data | | |
| 48 | HEADER | | Normal data | | |
| 49 | HEADER | AF Header | Turbo data | Normal data | |
| 50 | HEADER | | Normal data | | |
| 51 | HEADER | | Normal data | | |
| 52 | HEADER | | Normal data | | |

FIG. 11

DUAL TRANSMISSION STREAM GENERATING DEVICE AND METHOD

CROSS-REFERENCE TO RELATED APPLICATIONS

This application claims the benefit of U.S. Provisional Application Nos. 60/728,777 filed Oct. 21, 2005; 60/734,295 filed Nov. 8, 2005; 60/738,050 filed Nov. 21, 2005; 60/739,448 filed Nov. 25, 2005; 60/788,707 filed Apr. 4, 2006 in the U.S. Patent and Trademark Office; and Korean Application No. 2006-68057, filed Jul. 20, 2006 in the Korean Intellectual Property Office, the disclosures of which are incorporated herein by reference.

BACKGROUND OF THE INVENTION

1. Field of the Invention

Aspects of the present invention generally relate to a dual transmission stream generating device and method for generating a dual transmission stream which includes a normal stream and a turbo stream for digital broadcasting. More particularly, aspects of the present invention relate to a dual transmission stream generating device and method for improving a digital broadcast performance by generating a dual transmission stream which includes a normal stream and a robust-processed turbo stream in order to enhance a reception performance of an Advanced Television Systems Committee (ATSC) Vestigial Sideband Modulation (VSB) system which is a. terrestrial Digital Television (DTV) system.

2. Description of the Related Art

A single-carrier ATSC VSB system, which is a terrestrial digital broadcasting system used in the United States of America and in other areas, uses a field sync having 312 segments or packets. Hence, its reception performance is not good in a poor channel environment, especially, in a Doppler fading channel.

Figure 1:
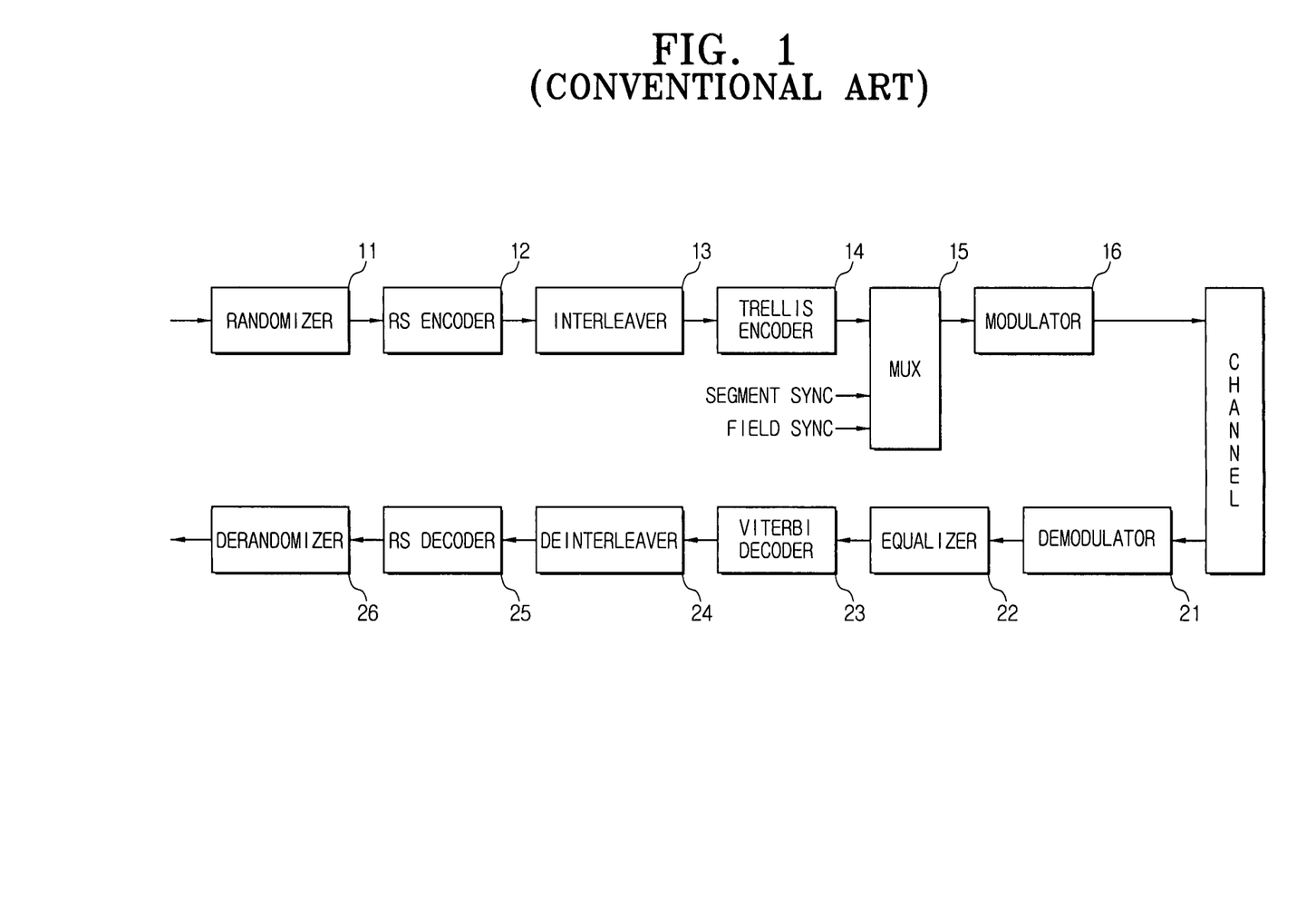
FIG. 1 is a block diagram of a digital broadcasting (ATSC VSB) transmission and reception system.

FIG. 1 is a block diagram of a transmitter and a receiver representing a general terrestrial digital broadcasting system that conforms to the ATSC DTV standard. The digital broadcasting transmitter of FIG. 1 is an Enhanced Vestigial Sideband Modulation (EVSB) system suggested by Philips, and is structured to generate and transmit a dual stream by adding a robust data to a conventional normal stream of the conventional ATSC VSB system.

As shown in FIG. 1, the digital broadcasting transmitter executes an error correction coding by inducing a randomizer 11 to randomize the dual stream, a Reed-Solomon (RS) encoder 12 which is a concatenated coder to add a parity byte to the transmission stream to correct errors occurring during the transmission due to certain channel characteristics, an interleaver 13 to interleave an RS-encoded data in a certain pattern, and a trellis encoder 14 to map to 8-level symbols by trellis-encoding the interleaved data at a ⅔ rate.

Figure 2:
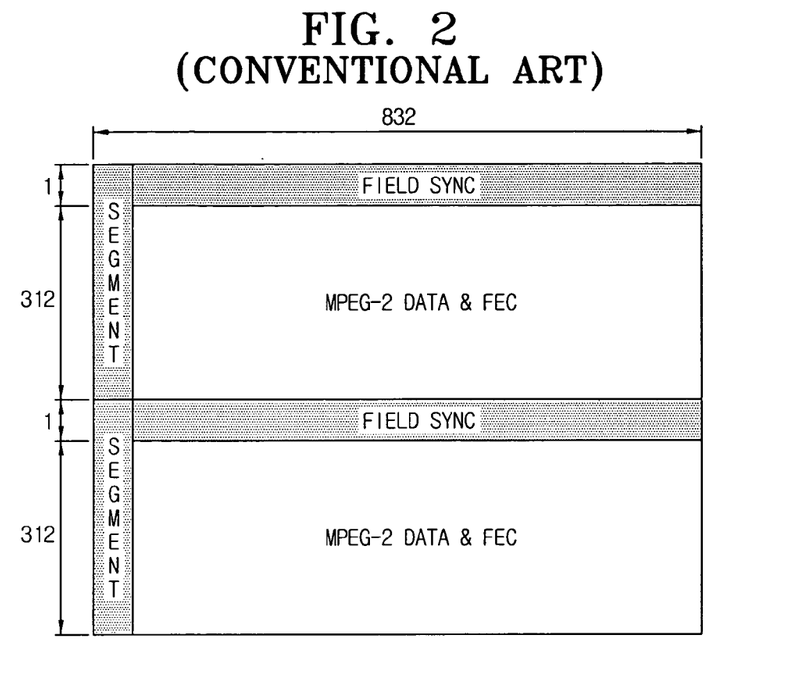
FIG. 2 is a diagram of a frame format of a conventional ATSC VSB data.

The digital broadcasting transmitter further includes a multiplexer 15 to insert field syncs and segment syncs to the data which went through the error correction coding, as shown in FIG. 2, and a modulator 16 to insert a pilot tone by adding a certain DC value to the data symbols having the inserted segment sync and field sync, to perform the VSB modulation through pulse shaping, to up-convert to an RF channel band signal, and to transmit the converted signal.

Accordingly, the digital broadcasting transmitter multiplexes (not shown) and applies the normal data and the robust data to the randomizer 11 according to the dual stream scheme which transmits the normal data and the robust data in one channel. As shown in FIG. 1, the input data is randomized in the randomizer 11, the randomized data is outer-encoded in the RS encoder 12 which is an outer encoder, and the outer-encoded data is interleaved in the interleaver 13. The interleaved data is inner-encoded by 12 symbols at the trellis encoder 14 and mapped to 8-level symbols. The field sync and the segment sync are inserted to the mapped data in the multiplexer 15. Next, the multiplexed data is transmitted after the pilot tone is inserted, the VSB modulation is performed, and the multiplexed data is converted into an RF signal in the modulator 16.

A digital broadcasting receiver of FIG. 1, includes a tuner (not shown) to convert the RF signal, which is received through a channel, to a baseband signal, a demodulator 21 to perform sync detection and demodulation on the converted baseband signal, an equalizer 22 to compensate for a channel distortion occurring due to multiple paths with respect to the demodulated signal, a viterbi decoder 23 to correct errors in the equalized signal and to decode the equalized signal into symbol data, a deinterleaver 24 to deinterleave the decoded data which was interleaved by the interleaver 13 of the digital broadcasting transmitter, an RS decoder 25 to correct errors, and a derandomizer 26 to derandomize the data corrected at the RS decoder 25 and to output an MPEG-2 transmission stream.

Hence, the digital broadcasting receiver of FIG. 1 recovers the original signal by down-converting the RF signal to the baseband signal, demodulating and equalizing the down-converted signal, and carrying out channel decoding in an operation that is an inverse of the operation performed the digital broadcasting transmitter.

FIG. 2 shows a VSB data frame having the inserted segment sync and field sync of a digital broadcasting (8-VSB) system used, for example, in the U.S. As shown in FIG. 2, one frame consists of 2 fields, and one of the fields consist of a field sync segment, which is the first segment, and another of the fields consist of 312 data segments or packets. In the VSB data frame shown in FIG. 2, each of the data segments corresponds to one MPEG-2 packet and such segments consist of a 4-symbol segment sync and 828 data symbols.

In FIG. 2, the segment sync and the field sync, which are the sync signals, are used for synchronization and equalization in the digital broadcasting receiver. In other words, the field sync and the segment sync are already known to the digital broadcasting transmitter and the digital broadcasting receiver and are used as reference signals by the digital broadcasting receiver to synchronize and equalize the VSB data frame.

The terrestrial digital broadcasting system of FIG. 1 is structured to generate and transmit the dual stream by adding the robust data to the normal data of the conventional ATSC VSB system so that the robust data can be transmitted together with the normal data.

However, the terrestrial digital broadcasting system of FIG. 1 cannot enhance the poor reception performance of the conventional dual stream in a multipath channel even when the conventional dual stream is transmitted with the added robust data. That is, the reception performance is not improved at all even with the improved dual stream. In addition, with respect to the robust data (turbo stream), the reception performance does not show great improvement in the multipath channel or environment. Therefore, there is demand for generation of a dual transmission stream to effectively transmit the robust data (turbo stream) and the normal data (normal stream) and process the robust data (turbo stream) more robustly.

SUMMARY OF THE INVENTION

Aspects of the present invention are provided in view of the above, and includes a dual transmission stream generating device and method for generating a dual transmission stream including a normal stream and a turbo stream to improve a reception performance of the ATSC VSB system which is a terrestrial DTV system, and particularly, to process the turbo stream more robustly by providing an area for parity insertion in the turbo stream.

According to an aspect of the present invention, there is a dual transmission stream generating device including an adaptor which receives a normal stream and generates an adaptation field in an area of a packet of the normal stream; and a stuffer which generates a packet for the dual transmission stream by stuffing packet data of the turbo stream into the adaptation field.

The adaptor may generate the adaptation field in a portion of all of the packets of the normal stream.

In this case, the dual transmission stream may include at least one field which comprises a plurality of packets, and each of the plurality of the packets may include turbo data and normal data.

The adaptor may generate the adaptation field in an entire payload area of some of the packets of the normal stream.

In this case, the dual transmission stream may include at least one field which comprises a plurality of packets, and some of the plurality of the packets are of a first type and may include turbo data, some of the plurality of packets are of a second type and may include normal data, and the first and second types of packets may be arranged in an alternating manner.

The adaptor may generate the adaptation field in a portion of some of the packets of the normal stream.

In this case, the dual transmission stream may include at least one field which comprises a plurality of packets, some of the plurality of the packets are of a first type and may include turbo data and normal data, some of the plurality of the packets are of a second type and may include normal data, and the first and second types of the packets may be arranged in an alternating manner.

The dual transmission stream may include at least one field which comprises a plurality of packets. Some of the plurality of the packets are of a first type and may include turbo data, some of the plurality of the packets are of a second type and may include turbo data and normal data, some of the plurality of the packets are of a third type and may include normal data, and the first, second, and third types of packets may be arranged in an alternating manner.

The dual transmission stream generating device may further include a Reed-Solomon (RS) encoder to receive and to RS-encode the packets of the turbo stream; an interleaver to interleave the RS-encoded packets of the turbo stream; and a duplicator to generate a parity insertion area in the interleaved packets of the turbo stream and to provide the packets of the turbo stream to the stuffer.

The adaptor may generate an option field to record packet information in a fixed position in the packet of the normal stream.

In this case, the option field may contain at least one information of a program dock reference (PCR), an original program dock reference (OPCR), an adaptation field extension length, a transport private data length, a splice countdown, or any combination thereof.

According to an aspect of the present invention, a dual transmission stream generating method includes generating an adaptation field in an area of a packet of a normal stream; and generating a packet for the dual transmission stream by stuffing packet data of a turbo stream into the adaptation field.

The operation of generating the adaptation field may generate the adaptation field in a portion of all of the packets of the normal stream.

In this case, the dual transmission stream may include at least one field which comprises a plurality of packets, and each of the plurality of the packets may include turbo data and normal data.

The operation of generating the adaptation field may generate the adaptation field in an entire payload area of some of the packets of the normal stream.

In this case, the dual transmission stream may include at least one field which comprises a plurality of packets, and some of the plurality of the packets are of a first type and may include turbo data, some of the plurality of the packets are of a second type and may include normal data, and the first and second types of the packets may be arranged in an alternating manner.

The operation of generating the adaptation field may generate the adaptation field in a portion of some of the packets of the normal stream.

In this case, the dual transmission stream may include at least one field which comprises a plurality of packets, some of the plurality of the packets are of a first type and may include turbo data and normal data, some of the plurality of packets are of a second type and may include normal data, and the first and second types of the packets may be arranged in an alternating manner.

The dual transmission stream may include at least one field which comprises a plurality of packets. Some of the plurality of the packets are of a first type and may include turbo data, some of the plurality of the packets are of a second type and may include turbo data and normal data, some of the plurality of the packets are of a third type and may include normal data, and the first, second, and third types of the packets may be arranged in an alternating manner.

The dual transmission stream generating method may further include receiving the turbo stream and performing Reed-Solomon (RS) encoding; interleaving the RS-encoded packets of the turbo stream; and generating a parity insertion area in the interleaved packets of the turbo stream and applying the turbo stream to the operation of generating the adaptation field.

The operation of generating the adaptation field may generate an option field to record packet information in a fixed position of the packet of the normal stream.

In this case, the option field may contain at least one information of a program clock reference (PCR), an original program dock reference (OPCR), an adaptation field extension length, a transport private data length, and a splice countdown.

According to an aspect of the present invention, a transmission stream generating device generating the transmission stream includes at least one field having a plurality of packets, the device includes a generator to generate an adaptation field in a payload area of a received packet, and a stuffer to incorporate at least one of a turbo data and an option data into the adaptation field.

According an aspect of the present invention, a transmission stream generating method for generating a transmission stream includes at least one field having a plurality of packet, includes generating an adaptation field in a payload area of a received packet, and incorporating at least one of a turbo data and an option data into the adaptation field.

According to an aspect of the present invention, a transmission stream includes a field having 312 packets, and each of the packets contains at least one of the turbo data, the option data, a normal data, or any combination thereof.

According to an aspect of the present invention, a transmission stream includes a plurality of packets each containing at least one of a turbo data, an option data in an option field, and a normal data, wherein and a position of the option field may be structured to not overlap with the turbo data within each packet.

According to an aspect of the present invention, a transmission stream generating method includes detecting a turbo stream from a dual transmission stream, and transforming the turbo stream into a robust data stream by appending a parity data for the turbo stream into the parity insertion area of the detected turbo stream.

Additional aspects and/or advantages of the invention will be set forth in part in the description which follows and, in part, will be obvious from the description, or may be learned by practice of the invention.

BRIEF DESCRIPTION OF THE DRAWING

Reference will now be made in detail to the aspects of the present invention, examples of which are illustrated in the accompanying drawings, wherein like reference numerals refer to like elements throughout. The aspects are described below to explain the present invention by referring to the figures. which:

FIGS. 6 through 10 are conceptual diagrams of various formats of the dual transmission stream generated at the dual transmission stream generating device according to aspects of the present invention.

DETAILED DESCRIPTION OF THE EMBODIMENTS

Reference will now be made in detail to the aspects of the present invention, examples of which are illustrated in the accompanying drawings, wherein like reference numerals refer to the like elements throughout. The aspects are described below to explain the present invention by referring to the figures.

Figure 3:
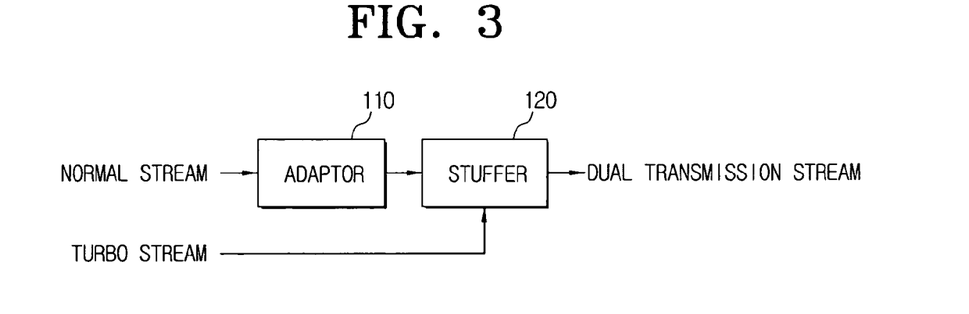
FIG. 3 is a block diagram of a dual transmission stream generating device according to an aspect of the present invention.

FIG. 3 is a block diagram of a dual transmission stream generating device according to an aspect of the present invention. The dual transmission stream generating device of FIG. 3 includes an adaptor 110 and a stuffer 120.

The adaptor 110 receives a normal stream of data and generates an adaptation field in a certain area of a certain packet of the normal stream. The location of the generated adaptation field may vary depending on the format of a packet of the dual transmission stream, which will be described below.

The stuffer 120 generates a dual transmission stream by inserting a turbo stream of data into the adaptation field in the normal stream of data. The dual transmission stream is a stream in which various packets containing the turbo stream and/or the normal stream are combined. The turbo stream is a data stream which is compressed according to a compression standard and is processed robustly by having an area for parity inserted therein. The normal stream and the turbo stream can be received from external modules such as cameras for broadcasting, and/or various internal modules such as a compression processing module (e.g., MPEG-2 module), a video encoder, and/or an audio encoder.

A frame of the dual transmission stream generated by the stuffer 120 includes at least one field. The field consists of a plurality of packets. The turbo stream can be positioned in some of the plurality of the packets.

Figure 4:
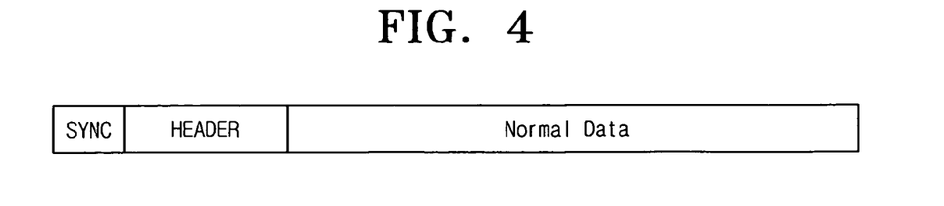
FIG. 4 is a conceptual diagram of a normal packet format received by the dual transmission stream generating device of FIG. 3.

FIG. 4 is a conceptual diagram of a normal packet format received into the dual transmission stream generating device of FIG. 3. Referring to FIG. 4, a packet of the normal stream can include a sync, a header, and normal data. The header can contain a transport error indicator, a payload start indicator, a transport priority, a packet identifier (PID), and so forth.

The entire normal packet of FIG. 4 can have 188 bytes. Of the 188 bytes, 1 byte is assigned for the sync, 3 bytes are assigned for the header, and 184 bytes are assigned for the payload, i.e., the normal data recording area, or an area not including the sync and the header. The dual transmission stream generating device of FIG. 3 receives the normal stream containing normal packets as shown in FIG. 4 and generates an adaptation field in one or more of the normal packets. In this case, the adaptation field can be generated using a portion of the payload area of the packet.

Figure 5:
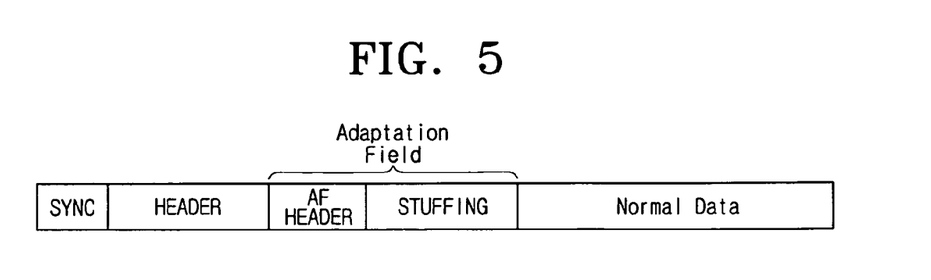
FIG. 5 is a conceptual diagram of a normal packet format having an adaptation field according to an aspect of the present invention.

FIG. 5 is a conceptual diagram of a normal packet format having an adaptation field according to an aspect of the present invention. Referring to FIG. 5, the normal packet includes a sync, a header, an adaptation field, and a normal data area. The adaptation field includes an adaptation field (AF) header and a stuffing area. The AF header contains information relating to a position and a size of the adaptation field and consists of 2 bytes. The size of the stuffing area can be varied according to a quantity of data to be stuffed into the adaptation field. For instance, the size of the stuffing area may be N bytes, where N may be a value from 0 through 182 in bytes. Once the adaptation field is generated in the normal packet, the payload area, i.e., the normal data recording area is reduced by N so that the payload area includes the adoption field and the normal data area. For example, if the entire payload area is 184 bytes, the normal data area after generation of the adaptation field has of 184-N bytes. Once the adaptation field is generated, a control area for controlling the adaptation field may be added to the header.

The stuffer 120 can generate a dual packet by stuffing the received turbo stream into the adaptation field of the normal packet of FIG. 5. Although FIG. 5 illustrates the adaptation field as being generated in a portion of the payload area, the adaptation field may occupy all of the payload area in various aspects of the present invention. As an example, if an adaptation field occupies all of the payload area, then a packet may be stuffed entirely with the turbo stream.

Figure 6:
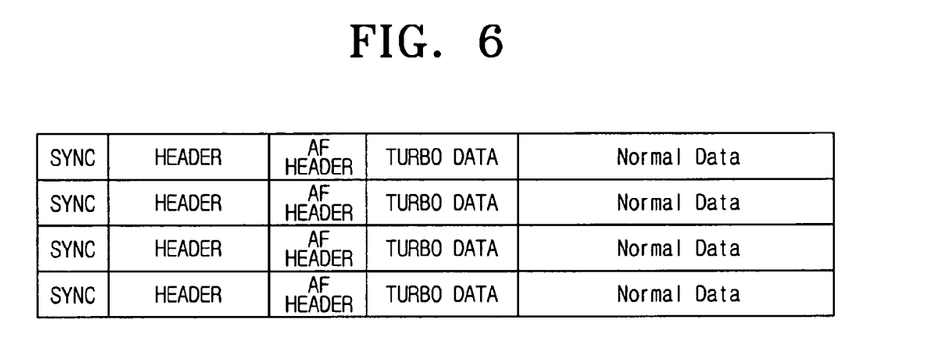

In various aspects of the present invention, various transmission streams are structured using one or more packets, and one or more types of packets. FIG. 6 is a conceptual diagram of a format of the dual transmission stream generated by the dual transmission stream generating device according to an aspect of the present invention. Referring to FIG. 6, the dual transmission stream is structured with a plurality of packets being connected in series. In the aspect of FIG. 6, each packet is a dual packet that includes the turbo stream and the normal stream. Specifically, the dual packet includes the sync, the header, the AF header, the turbo steam data, and the normal stream data. As such, the dual transmission stream is structured to have sequentially arranged packets that all include both the turbo stream and the normal stream in the aspect shown.

Figure 7:
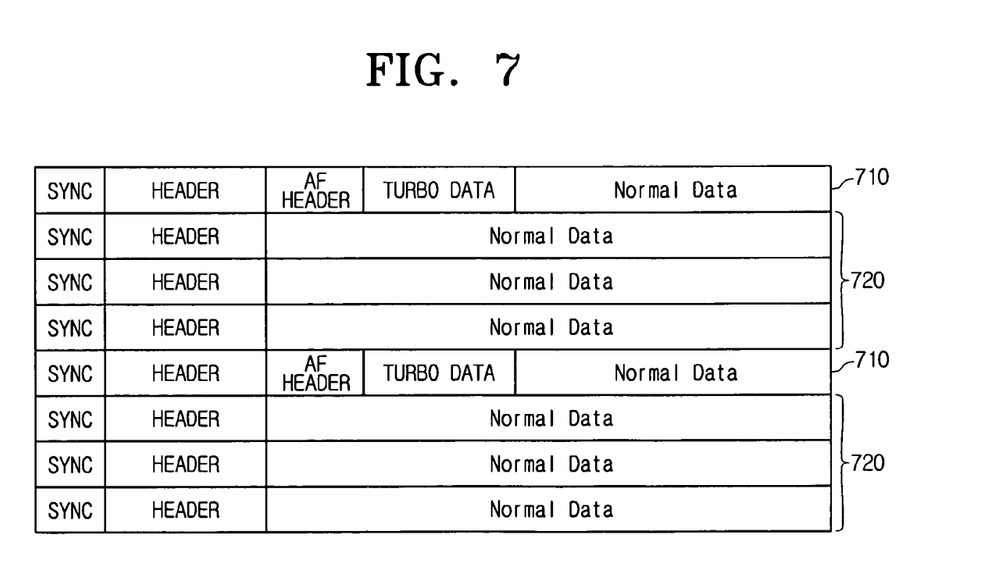

FIG. 7 is a conceptual diagram of another format of the dual transmission stream generated by the dual transmission stream generating device according to an aspect of the present invention. In FIG. 7, some packets 710 (dual packets) of the dual transmission stream include both the turbo stream and the normal stream. Other packets 720 (normal packets) include only the normal stream. The dual packets 710 and the normal packets 720 can be arranged in an alternating manner, any pattern, and/or in any way to structure the dual transmission stream according to an aspect of FIG. 7.

For example, when one field of a frame of the dual transmission stream consists of 312 packets, there may be 78 dual packets 710 which include both the turbo stream and the normal stream and 234 normal packets 720 or others arranged therein.

On the other hand, when there are 70 dual packets 710, which include both the turbo stream and the normal stream in the dual transmission stream, some of the 312 packets in one field of the dual transmission stream can be structured such that the dual packets 710 including both the turbo stream and the normal stream, and the other packets such as the normal packets 720 are arranged among 280 of the packets in a 1:3 ratio (that is by 4 packets for 70 times), and the remaining 32 packets (a number obtained by subtracting 280 from 312) consist of only the normal packet. In other words, any number of dual packets and the other packets, such as normal packets, may be mixed as desired within a field of a frame of the dual transmission stream.

Figure 8:
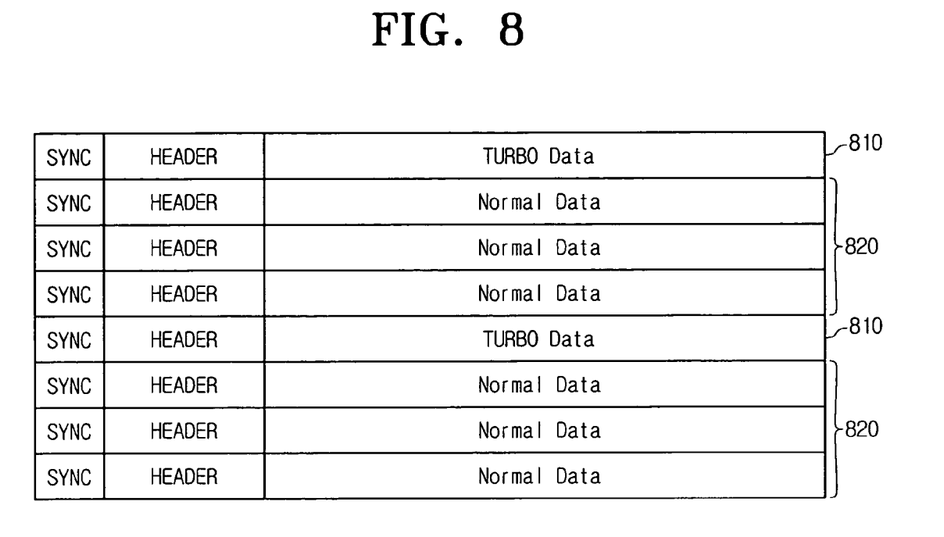

FIG. 8 is a conceptual diagram of still another format of the dual transmission stream generated by the dual transmission stream generating device according to an aspect of the present invention. In the dual transmission stream of FIG. 8, some packets 810 include only the turbo stream and are turbo packets, while other packets 820 include only the normal stream and are normal packets. Some of the turbo packets 810 and some of the normal packets 820 may be arranged in an alternating manner, in any pattern, and/or in any way. Although FIG. 8 illustrates that the turbo packets 810 and the normal packets 820 are arranged in a 1:3 ratio within the dual transmission stream, they may be arranged in any n:m ratio (n and m are natural numbers) in various aspects of the present invention. Examples of the various ratios include 1:4, 2:2, 2:3, and the like.

Figure 9:
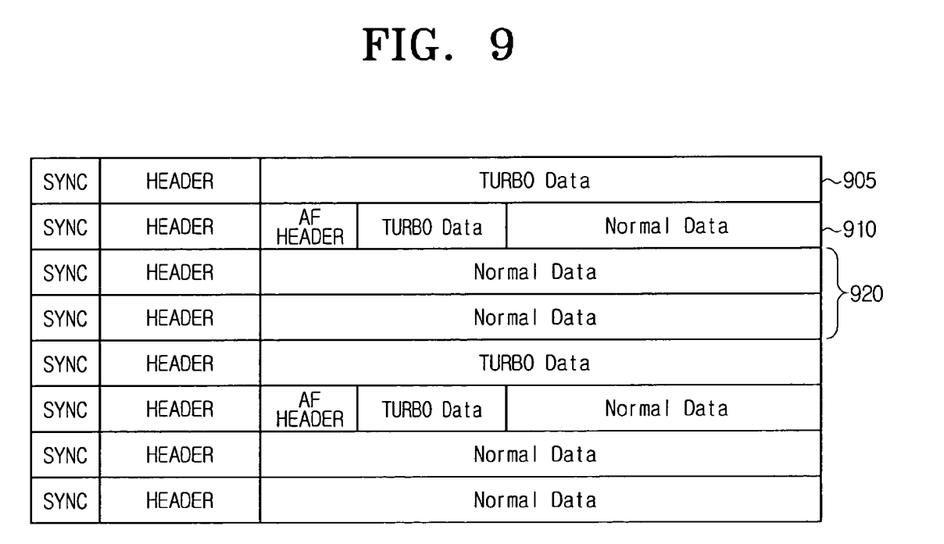

FIG. 9 is a conceptual diagram of yet another format of the dual transmission stream generated by the dual transmission stream generating device according to an aspect of the present invention. In FIG. 9, of a plurality of packets comprising the dual transmission stream includes a first packet 905 (turbo packet) that includes only the turbo stream, a second packet 910 (a dual packet) that includes both the turbo stream and the normal stream, and a third packet 920 (a normal packet) that includes only the normal stream. The first, second, and third packets may be arranged in an alternating manner, in any pattern, or in any way. In this case, the first, second, and third packets may be arranged in an n:m:x ratio (n, m, and x being natural numbers). The first, second, and third packets are arranged in a 1:1:2 ratio in the aspect of the present invention shown in FIG. 9.

FIG. 10 is a conceptual diagram of an expanded dual transmission stream according to an aspect of the present invention. The dual packets 1010 and the normal packets 1020 are the same as those shown in FIG. 7. In the aspect shown in FIG. 10, the dual packets 1010 including both the turbo stream and the normal stream and the normal packets 1020 including only the normal stream are arranged in an alternating manner. However, it is understood that they may be arranged in any pattern and/or in any way. In the aspect of the present invention shown in FIG. 10, an option field is provided in some of the packets 1030 (an option packet) of the dual transmission stream. The option field is an area containing various information relating to the option packet 1030 and/or other packets.

The position of the option field may be structured to not overlap with the turbo stream within a packet. Further, a position of the option packet 1030 may be structured not to overlap with a position of the dual packet 1010 containing the turbo stream and the normal stream within the dual transmission stream. For example, the dual packets 1010 are located in positions 1, 5, 9, 17 and so on. In view of the above, the option packet 1030 is located in position 15 and replaces one of the normal packets 1020. Accordingly, in the aspect of the present invention shown in FIG. 10, the option packet 1030 may be located as the 15th packet of the dual transmission stream. It is understood that in other aspects of the present invention, a turbo packet may be included in the dual transmission stream of FIG. 10.

In various aspects of the present invention, information recorded in the option field of the option packet 1030 may be at least one of a program clock reference (PCR), an original program clock reference (OPCR), an adaptation field extension length, a transport private data length, a splice countdown, or any combination thereof. Accordingly, an option packet may contain the program dock reference (PCR), the original program dock reference (OPCR), the adaptation field extension length, the transport private data length, the splice countdown information, or any combination thereof, and may be positioned in a respective position of the dual transmission stream.

For instance, when 312 packets are divided by groups of 52 packets, the position of the various option packets 1030 within the dual transmission stream may be expressed as follows.

PCR (occupies 6 bytes): 52n+15, n=0
OPCR (occupies 6 bytes): 52n+15, n=1
adaptation field extension length (occupies 2 bytes): 52n+15, n=2
transport private data length (occupies 5 bytes): 52n+15, n=3, 4, 5
splice countdown (occupies 1 byte): 52n+15, n=0, 1, 2, 3, 4, 5

Accordingly, a PCR packet may be located as the 15th packet, an OPCR packet may be located as the 67th packet, and the transport private data length packet may be positioned as the 171st, 223rd, and 275th packets, for example, of the dual transport stream, and so on.

In addition to the formats shown in FIGS. 6 through 10, it is possible to variously structure the various packets of the dual transmission stream so that the turbo stream is stuffed into the normal data area of a packet having the option field so that a packet contains one or both of the option information and a turbo stream. Also, the ratio of such an option packet containing a turbo stream in the dual transmission stream is adjustable.

Figure 11:
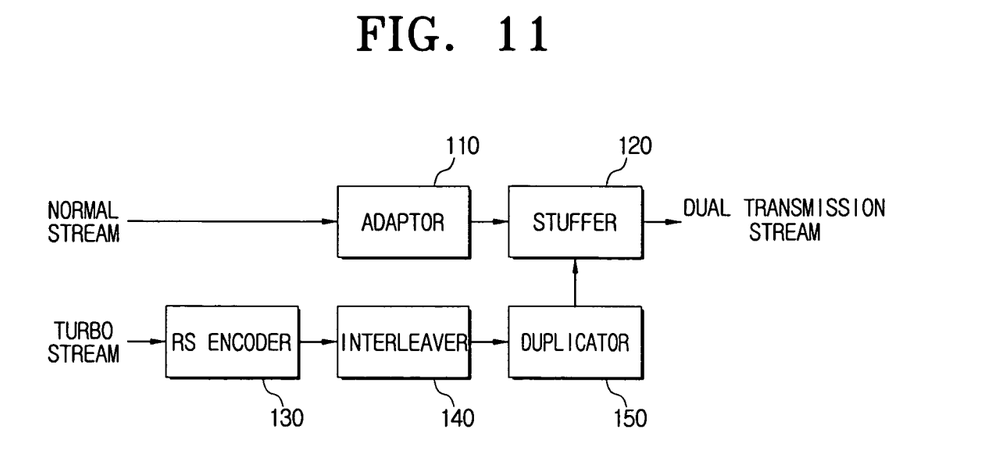
FIG. 11 is a detailed block diagram of the dual transmission stream generating device according to an aspect of the present invention.

FIG. 11 is a detailed block diagram of the dual transmission stream generating device according to another aspect of the present invention. Referring to FIG. 11, the dual transmission stream generating device includes an adaptor 110, a stuffer 120, a RS encoder 130, an interleaver 140, and a duplicator 150. As the adaptor 110 and the stuffer 120 provides a dual transmission stream by combining single transmissions of the normal stream and the turbo stream, they can be called a multiplexer (MUX).

The RS encoder 130 serves to receive the turbo stream from an outside location and to RS-encode the received turbo stream. That is, the RS encoder 130 receives the turbo stream which includes the sync, the header, and the turbo data area. The entire turbo stream may consist of 188 bytes, particularly, a 1-byte sync, a 3-byte header, and a 184 byte turbo data. The RS encoder 130 removes the sync from the turbo stream and adds a 20-byte parity by calculating a parity with respect to the turbo data area. Consequently, a packet of the turbo stream (an encoded turbo stream) ultimately consists of 207 bytes in total. Of the 207 bytes, 3 bytes are assigned to the header, 184 bytes are assigned to the turbo data, and 20 bytes are assigned to the parity.

The interleaver 140 interleaves the RS-encoded turbo stream and provides the interleaved turbo stream to the duplicator 150.

The duplicator 150 generates a parity insertion area for inserting the parity in the turbo stream and provides the turbo stream to the stuffer 120. The stuffer 120 receives the normal stream having the adaptation field generated by the adaptor 110, and constructs a dual packet by stuffing the adaptation field with the turbo stream provided from the duplicator 150. Such dual packets then may be included in a dual transmission stream in various aspects of the present invention.

Descriptions will be provided below regarding how the duplicator 150 generates the parity insertion area. First, the duplicator 150 divides the constituent 188 bytes of the turbo stream, by groups of 2 or 4 bytes. Each of the divided bytes is stuffed with some of the bit values of the original byte, and a null data (e.g., 0). The null data area becomes the parity insertion area.

In detail, for example, if bits in one byte are a, b, c, d, e, f, g, h starting with the most significant bit (MSB) and suppose that the bits are input in that order. If the input byte is doubled in size by the duplicator 150, the output of can be represented as a, a, b, b, c, c, d, d, e, e, f, f, g, g, h, h. In other words, each bit is duplicated. In this case, 2 bytes, including 1 byte of a, a, b, b, c, c, d, d (i.e., the first 8 bits of the duplicated byte) and 1 byte of e, e, f, f, g, g, h, h (i.e., the remaining 8 bits of the duplicated byte) are output in sequence beginning with the MSB.

In a case that the input byte is quadrupled in size, the output of the duplicator 150 can be expressed as a, a, a, a, b, b, b, b, c, c, c, c, d, d, d, d, e, e, e, e, f, f, f, f, g, g, g, g, h, h, h, h. such that 4 bytes are produced. Once duplicated, quadrupled, or replicated in any way, the duplicator 150 may stuff positions other than designated positions with random values, i.e., with null data without having to duplicate the input bits. For instance, when the duplicator 150 doubles the input so that there are two successive identical bits, the former bit sustains its original input and the latter bit is stuffed with a random value represented as x. Therefore, after such stuffing, the output may look like a, x, b, x, c, x, . . . rather than a, a, b, b, cc, . . . . Of course, the stuffing may occur vice versa. In other words, the duplicator 150 may stuff the former bit instead and the output may look like x, a, x, b, x, c, x, . . . , and so on. When the input is quadrupled, the original input may be positioned to one of first, second, third, and fourth positions and the other positions may be stuffed with random values.

The dual transmission stream generated by the dual transmission stream generating device according to an aspect of the present invention is transmitted to the receiver after passing through the various randomizing, encoding, robust processing, sync multiplexing, and modulation processes. Robust processing detects only the turbo stream from the dual transmission stream and transforms the turbo stream into a robust data stream by appending a parity data for the turbo stream into the parity insertion area of the detected turbo stream, that is, into the parity insertion area generated by the duplicator 150. Since structures and procedures to process and transmit the generated dual transmission stream can be implemented with various schemes well known in the art, further explanation will be omitted for brevity.

A dual transmission stream generating method according to an aspect of the present invention receives the normal stream and generates an adaptation field in a normal packet of the normal stream. A position and a size of the generated adaptation field depend on a quantity of a turbo stream. More specifically, the adaptation field may occupy a portion or all of a payload area of the normal packet. Next, a dual packet is generated by stuffing the adaptation field with the turbo stream which is received separately. With respect to the turbo stream, RS encoding and interleaving are executed, a parity insertion area is provided, and an adaptation field is inserted. Since one can easily understand the dual transmission stream generating method of the present invention in reference to FIGS. 3 through 11, any flowcharts outlining the dual transmission stream generating method will be omitted for brevity.

In light of the foregoing, it is possible to generate the dual transmission stream including the normal stream and the turbo stream to improve the reception performance of the ATSC VSB system which is a terrestrial DTV system in operation in various countries, such as the United States. In this situation, the turbo stream and the normal stream can be transmitted efficiently by varying the structure of the dual transmission stream. Additionally, when the dual transmission stream generating device is applied to the digital broadcasting transmission system, it is compatible with the conventional normal data transmission system and improves the reception performance in various reception environment.

Although a few aspects of the present invention have been shown and described, it would be appreciated by those skilled in the art that changes may be made in these aspects without departing from the principles and spirit of the invention, the scope of which is defined in the claims and their equivalents.

What is claimed is:

1. A dual transmission stream generating device comprising:
    an adaptor which receives normal data and generates an adaptation field in an area in a packet of the normal data; and
    a stuffer which generates a packet for the dual transmission stream by stuffing turbo data into the adaptation field,
    wherein the turbo data is stuffed into the adaptation field after being encoded and interleaved.

2. The dual transmission stream generating device of claim 1, wherein the normal data contains a plurality of packets and the adaptor generates the adaptation field in a portion of all of the packets of the normal data.

3. The dual transmission stream generating device of claim 2, wherein the dual transmission stream includes at least one field which comprises a plurality of packets, and
    wherein each of the plurality of the packets includes a portion of the turbo data and a portion of the normal data.

4. The dual transmission stream generating device of claim 1, wherein the normal data contains a plurality of packets and the adaptor generates the adaptation field in the entire payload area of some of the packets of the normal data.

5. The dual transmission stream generating device of claim 4, wherein the dual transmission stream includes at least one field which comprises a plurality of packets, and wherein some of the plurality of the packets are of a first type and each of the first type packets includes a portion of the turbo data, some of the plurality of the packets are of a second type and each of the second type packets includes a portion of the normal data, and the first and second types of the packets are arranged in an alternating manner.

6. The dual transmission stream generating device of claim 1, wherein the normal data comprises a plurality of packets and the adaptor generates the adaptation field in a portion of each of some of the packets of the normal data.

7. The dual transmission stream generating device of claim 6, wherein the dual transmission stream includes at least one field which comprises a plurality of packets, and
   wherein some of the plurality of the packets are of a first type and each of the first type packets includes a portion of the turbo data and a portion of the normal data, some of the plurality of the packets are of a second type and each of the second type packets includes another portion of the normal data, and the first and second types of the packets are arranged in an alternating manner.

8. The dual transmission stream generating device of claim 1, wherein the dual transmission stream includes at least one field which comprises a plurality of packets, and
   wherein some of the plurality of the packets are of a first type and each of the first type packets includes a portion of the turbo data, some of the plurality of the packets are of a second type and each of the second type packets includes another portion of the turbo data and a portion of the normal data, some of the plurality of the packets are of a third type and each of the third type packets includes another portion of the normal data, and the first, second, and third types of the packets are arranged in an alternating manner.

9. The dual transmission stream generating device of claim 1, further comprising:
   a Reed-Solomon (RS) encoder to receive and RS-encode packets of the turbo data;
   an interleaver to interleave the RS-encoded packets of the turbo data; and
   a duplicator to generate a parity insertion area in the interleaved packets of the turbo data and to provide the packets of the turbo data to the stuffer.

10. The dual transmission stream generating device of one of claims 1, wherein the adaptor generates an option field to record packet information in a fixed position in the packet of the normal data.

11. The dual transmission stream generating device of claim 10, wherein the option field contains at least one information of a program clock reference (PCR), an original program clock reference (OPCR), an adaptation field extension length, a transport private data length, and a splice countdown.

12. A dual transmission stream generating method comprising:
   generating an adaptation field in an area in a packet of normal data; and
   generating a packet for the dual transmission stream by stuffing turbo data into the adaptation field,
   wherein the turbo data is stuffed into the adaptation field after being encoded and interleaved.

13. The dual transmission stream generating method of claim 12, wherein the operation of generating the adaptation field generates the adaptation field in a portion of all of the packets of the normal data.

14. The dual transmission stream generating method of claim 13, wherein the dual transmission stream includes at least one field which comprises a plurality of packets, and
   wherein each of the plurality of the packets includes a portion of the turbo data and a portion of the normal data.

15. The dual transmission stream generating method of claim 12, wherein the normal data contains a plurality of packets and the operation of generating the adaptation field generates the adaptation field in an entire payload area of some of the packets of the normal data.

16. The dual transmission stream generating method of claim 15, wherein the dual transmission stream includes at least one field which comprises a plurality of packets, and
   wherein some of the plurality of the packets are of a first type and each of the first type packets includes a portion of the turbo data, some of the plurality of the packets are of a second type and each of the second type packets includes a portion of the normal data, and the first and second types of the packets are arranged in an alternating manner.

17. The dual transmission stream method device of claim 12, wherein the normal data comprises a plurality of packets and the adaptor generates the adaptation field in a portion of each of some of the packets of the normal data.

18. The dual transmission stream generating method of claim 17, wherein the dual transmission stream includes at least one field which comprises a plurality of packets, and
   wherein some of the plurality of the packets are of a first type and each of the first type packets includes a portion of the turbo data and a portion of the normal data, some of the plurality of the packets are of a second type and each of the second type packets includes another portion of the normal data, and the first and second types of the packets are arranged in an alternating manner.

19. The dual transmission stream generating method of claim 12, wherein the dual transmission stream includes at least one field which comprises a plurality of packets, and
   wherein some of the plurality of the packets are of a first type and each of the first type packets includes a portion of the turbo data, some of the plurality of the packets are of a second type and each of the second type packets includes another portion of the turbo data and a portion of the normal data, some of the plurality of the packets are of a third type and each of the third type packets includes another portion of the normal data, and the first, second, and third types of the packets are arranged in an alternating manner.

20. The dual transmission stream generating method of claim 12, further comprising:
   receiving the turbo data and performing Reed-Solomon (RS) encoding;
   interleaving the RS-encoded packets of the turbo data; and
   generating a parity insertion area in the interleaved packets of the turbo data and applying the packets of the turbo data to the operation of generating the adaptation field.

21. The dual transmission stream generating method of one of claims 12, wherein the operation generating the adaptation field generates an option field to record packet information in a fixed position of the packet of the normal data.

22. The dual transmission stream generating method of claim 21, wherein the option field contains at least one information of a program clock reference (PCR), an original program clock reference (OPCR), an adaptation field extension length, a transport private data length, and a splice countdown.

23. A transmission stream generating device generating a transmission stream that includes at least one field having a plurality of packets, the device comprising:
- a generator to generate an adaptation field in a payload area of a received packet comprising normal data; and
- a stuffer to incorporate at least one of turbo data, which is encoded and interleaved, and an option data into the adaptation field,
- wherein the adaptation field is generated in the payload area.

24. The transmission stream generating device of claim 23, wherein the payload area includes the normal data.

25. The transmission stream generating device of claim 23, wherein the turbo data comprises an inserted parity area and data.

26. The transmission stream generating device of claim 25, wherein the parity area includes replicated bytes, some of which are selectively stuffed with a random value.

27. The transmission stream generating device of claim 23, wherein the stuffer incorporates the option data into the adaptation field, and
- wherein the option data is at least one of information on a program clock reference (PCR), an original program clock reference (OPCR), an adaptation field extension length, a transport private data length, and a splice countdown.

28. The transmission stream generating device of claim 27, the transmission stream comprising at least one of a packet containing the PCR in position 52n+15, where n=0; a packet containing the OPCR in position 52n+15, where n=1; a packet containing the adaptation field extension length in position 52n+15, where n=2; a packet containing the transport private data length in position 52n+15 where n=3, 4, 5; and a packet containing the splice countdown in position 52n+15, where n=0, 1, 2, 3, 4, 5.

29. The transmission stream generating device of claim 23, wherein the field of the transmission stream comprises 312 packets, and each of the packets contains at least one of turbo data, option data, and normal data.

30. A transmission stream generating method for generating a transmission stream that includes at least one field having a plurality of packets, the method comprising:
- generating an adaptation field in a payload area of a received packet comprising normal data; and
- incorporating at least one of turbo data, which is encoded and interleaved, and an option data into the adaptation field,
- wherein the adaptation field is generated in the payload area.

31. The transmission stream generating method of claim 30, wherein the payload area includes the normal data.

32. The transmission stream generating method of claim 30, wherein the turbo data comprises an inserted parity area and data.

33. The transmission stream generating method of claim 32, wherein the parity area includes replicated bytes, some of which are selectively stuffed with a random value.

34. The transmission stream generating method of claim 30, wherein the stuffer incorporates the option data into the adaptation field, and
- wherein the option data is at least one of information on a program clock reference (PCR), an original program clock reference (OPCR), an adaptation field extension length, a transport private data length, and a splice countdown.

35. The transmission stream generating method of claim 34, the transmission stream comprising at least one of a packet containing the PCR in position 52n+15, where n=0; a packet containing the OPCR in position 52n+15, where n=1; a packet containing the adaptation field extension length in position 52n+15, where n=2; a packet containing the transport private data length in position 52n+15 where n=3, 4, 5; and a packet containing the splice countdown in position 52n+15, where n=0, 1, 2, 3, 4, 5.

36. The transmission stream generating method of claim 30, wherein the field of the transmission stream comprises 312 packets, and each of the packets contains at least one of turbo data, option data, and normal data.

37. A transmission stream generating method, comprising detecting turbo data from a dual transmission stream; and
- transforming the turbo data into robust data by appending parity data for the turbo data to a parity insertion area of the detected turbo data,
- wherein at least a portion of the turbo data is included in an area disposed in a packet of normal data which constitutes the dual transmission stream along with the turbo data, and
- wherein the at least a portion of the turbo data is stuffed into the area after being encoded and interleaved.

38. The transmission stream generating method of claim 37, further comprising generating the parity insertion area of the turbo data, wherein the parity insertion area is generated by a duplicator.

39. A dual transmission stream generating device comprising:
- an adaptor which receives normal data comprising normal data packets and processes the normal data so that positions of the normal data packets are changed by stuffing additional data comprising additional data packets into the normal data; and
- a stuffer which generates a transmission stream by stuffing the additional data into the normal data,
- wherein the additional data is stuffed into the normal data after the additional data is encoded and interleaved, and
- wherein the additional data is arranged repeatedly in an interval of a predetermined number of packets of the normal data.

40. The dual transmission stream generating device of claim 39, wherein the transmission stream includes at least one field which comprises a plurality of packets, and
- wherein the plurality of packets comprises the additional data packets and the normal data packets.

41. The dual transmission stream generating device of claim 39, wherein the additional data packets and the normal data packets are arranged in the transmission stream in an alternating manner.

42. The dual transmission stream generating device of claim 39, wherein the additional data packets and the normal data packets are arranged in the transmission stream at regular intervals in an alternating manner.

43. A dual transmission stream generating method comprising:
- receiving normal data comprising normal data packets and processing the normal data so that positions of the normal data packets are changed by stuffing additional data comprising additional data packets into the normal data; and
- generating a transmission stream by stuffing the additional data into the normal data,
- wherein the additional data is stuffed into the normal data after the additional data is encoded and interleaved, and
- wherein the additional data is arranged repeatedly in an interval of a predetermined number of packets.

44. The dual transmission stream generating method of claim 43, wherein the transmission stream includes at least one field which comprises a plurality of packets, and
wherein the plurality of packets comprises the additional data packets and the normal data packets.

45. The dual transmission stream generating method of claim 43, wherein the additional data packets and the normal data packets are arranged in the transmission stream in an alternating manner.

46. The dual transmission stream generating method of claim 43, wherein the additional data packets and the normal data packets are arranged in the transmission stream at regular intervals in an alternating manner.

* * * * *